United States Patent
Leclerc et al.

(10) Patent No.: US 11,650,128 B2
(45) Date of Patent: May 16, 2023

(54) OPTICAL FIBER RECOGNITION USING BACKSCATTERING PATTERN

(71) Applicant: EXFO Inc., Quebec (CA)

(72) Inventors: Michel Leclerc, Quebec (CA); Pascal Gosselin-Badaroudine, Quebec (CA); Stephane Perron, Quebec (CA)

(73) Assignee: EXFO Inc., Quebec (CA)

( * ) Notice: Subject to any disclaimer, the term of this patent is extended or adjusted under 35 U.S.C. 154(b) by 0 days.

(21) Appl. No.: 17/360,357

(22) Filed: Jun. 28, 2021

(65) Prior Publication Data

US 2021/0404909 A1 Dec. 30, 2021

Related U.S. Application Data

(60) Provisional application No. 63/046,077, filed on Jun. 30, 2020.

(51) Int. Cl.
*G01M 11/00* (2006.01)
*H04B 10/071* (2013.01)

(52) U.S. Cl.
CPC .... *G01M 11/3145* (2013.01); *G01M 11/3127* (2013.01); *H04B 10/071* (2013.01); *G06F 2218/16* (2023.01)

(58) Field of Classification Search
CPC ... G06K 9/0055; H04B 10/071; G01M 11/31; G01M 11/3109; G01M 11/3118; G01M 11/3127; G01M 11/3136; G01M 11/3145; G01M 11/3154; G01M 11/3163; G01M 11/3172; G01M 11/3181; G01M 11/319
See application file for complete search history.

(56) References Cited

U.S. PATENT DOCUMENTS

| | | |
|---|---|---|
| 4,968,112 A | 11/1990 | Lovely et al. |
| 5,093,568 A | 3/1992 | Maycock |

(Continued)

FOREIGN PATENT DOCUMENTS

| | | |
|---|---|---|
| DE | 102016124654 A1 | 6/2018 |
| EP | 2356760 A1 | 8/2011 |

(Continued)

OTHER PUBLICATIONS

Luna, Luna Researchers Harness the Power of Fiber Fingerprints, 2019 [online] Retrieved from the Internet on Apr. 2, 2019: <URL: https://lunainc.com/fiber-optic-solutions/luna-researchers-harness-the-power-of-fiber-fingerprints/>.

(Continued)

*Primary Examiner* — Gordon J Stock, Jr.
(74) *Attorney, Agent, or Firm* — Helene Chotard

(57) ABSTRACT

There are provided methods and systems that enable the use of the backscattering pattern produced by an optical fiber in an OTDR trace as a signature (also referred to herein as the "RBS fingerprint") to recognize an optical fiber. It was found that it may be difficult to obtain repeatable signatures as those are sensitive to the wavelength of the OTDR laser source and the temperature of the fiber. OTDR methods and systems that are adapted to compare the backscattering pattern in a more repeatable manner are therefore provided. Once the repeatability issue is overcome, such signature can be used for identification purposes and enable new applications.

22 Claims, 10 Drawing Sheets

(56) References Cited

U.S. PATENT DOCUMENTS

| | | | |
|---|---|---|---|
| 5,285,305 A * | 2/1994 | Cohen | H04B 10/077 398/31 |
| 5,365,328 A | 11/1994 | Anderson | |
| 5,373,356 A | 12/1994 | Anderson | |
| 5,432,637 A | 7/1995 | Hakimi | |
| 5,442,434 A | 8/1995 | Liao | |
| 5,708,500 A * | 1/1998 | Anderson | G01M 11/3145 356/73.1 |
| 5,966,207 A | 10/1999 | Haskins | |
| 6,046,797 A * | 4/2000 | Spencer | G01M 11/3127 356/73.1 |
| 6,067,150 A * | 5/2000 | Beller | G01M 11/3109 356/73.1 |
| 6,674,518 B1 | 1/2004 | Asher | |
| 6,710,862 B1 | 3/2004 | Wilson | |
| 6,839,130 B2 * | 1/2005 | Araki | G01M 11/3127 356/73.1 |
| 7,440,087 B2 * | 10/2008 | Froggatt | G01M 11/3172 356/73.1 |
| 7,772,541 B2 | 8/2010 | Froggatt et al. | |
| 7,808,621 B2 | 10/2010 | Russell | |
| 7,859,654 B2 * | 12/2010 | Hartog | G01M 11/3127 356/73.1 |
| 8,482,725 B2 | 7/2013 | Perron et al. | |
| 8,570,501 B2 | 10/2013 | Nagel et al. | |
| 8,576,387 B2 | 11/2013 | Woodward et al. | |
| 8,670,110 B2 | 3/2014 | Schillab | |
| 8,711,341 B2 | 4/2014 | Blair et al. | |
| 8,964,172 B1 | 2/2015 | Breiholz et al. | |
| 9,097,615 B2 * | 8/2015 | Xia | G01M 11/3127 |
| 9,103,746 B2 | 8/2015 | Kaufhold | |
| 9,184,833 B2 | 11/2015 | Kassler | |
| 9,310,274 B2 * | 4/2016 | Nagel | G01M 11/3109 |
| 9,329,098 B2 | 5/2016 | Sanchez | |
| 9,423,316 B2 | 8/2016 | Perron | |
| 9,435,713 B2 | 9/2016 | Collier | |
| 9,709,460 B2 | 7/2017 | LeBlanc et al. | |
| 9,774,390 B2 | 9/2017 | Zhou | |
| 10,014,935 B2 | 7/2018 | Perron | |
| 10,135,531 B1 | 11/2018 | Joffe | |
| 10,371,596 B2 | 8/2019 | L'Heureux et al. | |
| 10,784,969 B2 | 9/2020 | Weiner | |
| 10,862,582 B1 | 12/2020 | L'Heureux et al. | |
| 11,035,753 B2 * | 6/2021 | Gagnon | H04B 10/071 |
| 11,125,648 B2 * | 9/2021 | Perron | G01M 11/3145 |
| 11,228,365 B1 * | 1/2022 | Desplat | G01M 11/3172 |
| 11,271,641 B1 | 3/2022 | Perron | |
| 11,368,214 B2 * | 6/2022 | Ahadian | H04B 10/071 |
| 2011/0149271 A1 | 6/2011 | Woodward et al. | |
| 2014/0362367 A1 | 12/2014 | Chen et al. | |
| 2015/0062562 A1 * | 3/2015 | Kassler | G01M 11/3154 356/73.1 |
| 2015/0124246 A1 | 5/2015 | Collier et al. | |
| 2020/0386653 A1 | 12/2020 | Perron | |
| 2021/0123817 A1 * | 4/2021 | Champavere | G01D 5/35364 |
| 2021/0199536 A1 * | 7/2021 | Perron | G01B 11/02 |
| 2022/0128434 A1 * | 4/2022 | Perron | G01M 11/3154 |

FOREIGN PATENT DOCUMENTS

| | | | |
|---|---|---|---|
| EP | 3758256 | 12/2020 | |
| KR | 20140051495 A * | 5/2014 | |
| WO | WO-9705713 A1 * | 2/1997 | .......... H04B 10/071 |
| WO | 2008115375 A1 | 9/2008 | |
| WO | WO-2009006837 A1 * | 1/2009 | ........ G01M 11/3127 |
| WO | 2011153126 A2 | 12/2011 | |
| WO | 2012087205 | 6/2012 | |
| WO | 2013002692 | 1/2013 | |
| WO | WO-2021158492 A1 * | 8/2021 | |

OTHER PUBLICATIONS

Gysel et al., Statistical Properties of Rayleigh Backscattering in Single-Mode Fibers, IEEE, Journal of Lightwave Technology, Apr. 1990, vol. 8. No. 4.

Mermelstein et al., Rayleigh scattering optical frequency correlation in a single-mode optical fiber, Optics Letters, Jan. 15, 2001, vol. 26, No. 2, Washington, D.C., United States.

K De Souza, Significance of coherent Rayleigh noise in fibre-optic distributed temperature sensing based on spontaneous Brillouin scattering, DOI: 10.1088/0957-0233/17/5/S21, Institute of Physics Publishing, Measurement Science and Technology, vol. 17, 2006, pp. 1065-1069.

Brodsky et al., Rayleigh backscattering from optical fibers—could it be used to identify individual fibers?, Optical Society of America, 2010.

Naseem et al., Composite Coding Scheme for OTDR SNR Enhancement, 11th International Conference on Telecommunications—ConTEL 2011, Special Session on Optical Access, ISBN: 978-3-85125-161-6, Jun. 15-17, 2011, Graz, Austria.

Palmieri et al., Distributed Optical Fiber Sensing Based on Rayleigh Scattering, The Open Optics Journal, 2013, vol. 7, (Suppl-1, M7) 104-127.

Villafani Caballero et al., Tuneable OTDR Measurements for WDM-PON Monitoring, Conference paper, DOI: 10.1109/IMOC.2013.6646511, Aug. 2013.

Du et al., Unclonable Optical Fiber Identification Based on Rayleigh Backscattering Signatures, IEEE, Journal of Lightwave Technology, DOI 10.1109/JLT.2017.2754285, 2017.

Guemes et al., Fiberoptic Distributed Sensing, STO-EN-AVT-220, retrieved Nov. 5, 2019.

Park et al., Coded optical time domain reflectometry: principle and applications, Proc. of SPIE vol. 6781, 678129, DOI: 10.1117/12.746977, 2007.

Koyamada et al., "Novel Fiber-Optic Distributed Strain and Temperature Sensor with Very High Resolution", IEICE Transactions on Communications, vol. E89-B, No. 5, May 2016, pp. 1722-1725.

Koyamada, Yahei, Imahama, Mutsumi, Kubota, Kenya, Hogari, Kazuo, "Fiber-Optic Distributed Strain and Temperature Sensing With Very High Measurand Resolution Over Long Range Using Coherent OTDR", Journal of Lightwave Technology, vol. 27, No. 9, May 1, 2009.

Hartog, Arthur H., "An Introduction to Distributed Optical Fibre Sensors", 1st edition Paperback—Jun. 28, 2018, pp. 267-273, CRC Press Taylor & Francis Group, Boca Raton, FL.

* cited by examiner

OPTICAL FIBER RECOGNITION USING BACKSCATTERING PATTERN

TECHNICAL FIELD

The present description generally relates to Optical Time-Domain Reflectometry (OTDR), and more particularly to identifying optical fibers using as a signature, the backscattering pattern produced by an optical fiber in OTDR traces.

BACKGROUND

The manufacturing process of optical fibers produces small fluctuations in the optical fiber structure along any segment of optical fiber. When such fluctuations interact with the OTDR test pulses, it creates interferences and modulations that produce a backscattering pattern in the acquired OTDR trace. Because the structural fluctuations along optical fibers are random, any measured backscattering pattern is unique to a given optical fiber segment and OTDR laser source combination.

For a given optical fiber segment and OTDR laser source combination, the measured backscattering pattern is not random. It is determined the small fluctuations in the fiber structure, combined with the characteristics of the OTDR laser source and is hence completely deterministic.

However, characteristics of the OTDR test pulses may fluctuate in time, including polarization state, wavelength and spectral shape, due, e.g., to temperature variations in the laser source. The ambient temperature of the optical fiber segment also changes the fiber structure and therefore the backscattering pattern. These characteristics of the OTDR test pulses and optical fiber structure can induce variations in the backscattering pattern associated with a given optical fiber segment.

The presence of such backscattering pattern phenomenon is known in the art of OTDR but is typically regarded as noise that should be eliminated. Conventional OTDRs are thus designed to try to minimize the amplitude of this backscattering pattern, e.g., by using broader light sources, and any remaining backscattering pattern is deemed noise.

Some have proposed to use this phenomenon to uniquely identify fibers, but applications are limited considering the above-described fluctuations.

There remains a need for identifying optical fibers using as a signature, the backscattering pattern produced by an optical fiber in OTDR traces.

SUMMARY

There are provided methods and systems that enable the use of the backscattering pattern produced by an optical fiber in an OTDR trace as a signature (also referred to herein as the "RBS fingerprint") to recognize an optical fiber. It was found that, under some conditions, it may be difficult to obtain repeatable backscattering patterns as those are sensitive to the wavelength of the OTDR laser source and the temperature of the fiber. OTDR methods and systems that are adapted to compare the backscattering patterns in a more repeatable manner are therefore provided. Once the repeatability issue is overcome, such signature can be used for identification purposes and enable new applications.

In accordance with one aspect, there are provided OTDR methods and systems which employ a temperature correction technique wherein a) each signature is pre-characterized over a range of temperatures or center wavelengths and matches are found by comparing a measured backscattering pattern to the set of patterns obtained for each pre-characterized signature, in order to find a match; or b) each signature is pre-characterized at a single temperature and, during measurement, the OTDR laser is tuned until a match is found between the measured backscattering pattern and a pre-characterized signature.

In accordance with one aspect, there is provided a method for comparing Optical Time-Domain Reflectometric (OTDR) signatures for optical fiber recognition, the method comprising:

receiving a set of backscattering patterns obtained over a first span of a first optical fiber link for different values of optical fiber temperatures or different values of OTDR laser center wavelengths, wherein each backscattering pattern corresponds to at least a portion of an OTDR trace acquired over the first span of the first optical fiber link;

receiving a backscattering pattern obtained over a second span of a second optical fiber link and corresponding to at least a portion of an OTDR trace acquired over the second span of the second optical fiber link; and comparing the backscattering pattern of said second span to the set of backscattering patterns of said first span to determine if the backscattering pattern of said second span matches one of the backscattering patterns of said set;

wherein said second span is determined to be the same as said first span if a match is found.

In some embodiments, the first and the second span of optical fiber each correspond to sub-portions of optical fiber links over which an OTDR trace was acquired.

In some embodiments, said set of backscattering patterns is previously obtained over the first span for different values of optical fiber temperatures and said second span of optical fiber is part of an optical fiber to be recognized.

In some embodiments, said set of backscattering patterns is previously obtained over the first span for different values of OTDR laser center wavelengths and said second span of optical fiber is part of an optical fiber to be recognized.

In some embodiments, said backscattering pattern is previously obtained over the second span, said first span of optical fiber is part of an optical fiber to be recognized and said set of backscattering patterns is obtained for different values of OTDR laser center wavelengths.

In some embodiments, the step of comparing comprises: calculating a correlation coefficient of at least one of said backscattering patterns of said first span and said backscattering pattern of said second span and comparing the correlation coefficient to a threshold to determine if said second span is the same as said first span.

In some embodiments, said backscattering patterns are acquired while the OTDR laser source is being polarization scrambled.

In accordance with another aspect, there is provided a computer program comprising instructions that, when executed by a processor, cause the processor to perform a method according to any one of above methods.

In accordance with another aspect, there is provided an OTDR system for comparing Optical Time-Domain Reflectometric (OTDR) signatures for optical fiber recognition, the OTDR system comprising:

an OTDR acquisition device connectable toward an end of the second optical fiber link for performing one or more OTDR acquisitions toward the second optical fiber link, wherein each OTDR acquisition is performed by propagating a test signal in the optical fiber link under test and detecting corresponding return light from the second optical fiber link so as to obtain an OTDR trace representing backscattered and reflected light as a function of distance in the optical fiber link; and a data storage storing a prerecorded set of backscattering patterns obtained over a first span of a first optical fiber link for different values of optical fiber temperatures or different values of OTDR laser center wavelengths, wherein each backscattering pattern corresponds to at least a portion of an OTDR trace acquired over the first span of first optical fiber link;

a processing unit comprising:

a signature recognition module comprising a comparison engine configured for comparing the backscattering pattern obtained over a second span of the second optical fiber link and corresponding to at least a portion of said OTDR trace, to the set of backscattering patterns of said first span to determine if the backscattering pattern of said second span matches one of the backscattering patterns of said set, wherein said second span is determined to be the same as said first span if a match is found.

In some embodiments, said set of backscattering patterns stored in said data storage is previously obtained over the first span for different values of optical fiber temperatures.

In some embodiments, said set of backscattering patterns stored in said data storage is previously obtained over the first span for different values of OTDR laser center wavelengths.

In some embodiments, said comparison engine is configured for calculating a correlation coefficient of at least one of said backscattering patterns of said first span and said backscattering pattern of said second span and comparing the correlation coefficient to a threshold to determine if said second span is the same as said first span.

In accordance with another aspect, there is provided an OTDR system for comparing Optical Time-Domain Reflectometric (OTDR) signatures for optical fiber recognition, the OTDR system comprising:

a tunable OTDR acquisition device connectable toward an end of a first optical fiber link for performing one or more OTDR acquisitions toward the first optical fiber link, wherein each OTDR acquisition is performed by propagating a test signal in the optical fiber link under test and detecting corresponding return light from the first optical fiber link so as to obtain an OTDR trace representing backscattered and reflected light as a function of distance in the optical fiber link; and a data storage storing at least one pre-recorded backscattering pattern obtained over a second span of a second optical fiber link, wherein the backscattering pattern corresponds to at least a portion of an OTDR trace acquired over the second span of the second optical fiber link; and a processing unit configured for:

comparing backscattering pattern obtained over a first span of said first optical fiber link and corresponding to at least a portion of OTDR trace, to said pre-recorded backscattering pattern of said second span to determine if the backscattering pattern of said first span matches the backscattering patterns of said second span, wherein said second span is determined to be the same as said first span if a match is found; and if no match is found, tuning an OTDR laser source of said OTDR acquisition device to a different value of laser center wavelength to perform another OTDR acquisition and repeating the comparing step to find a match.

In some embodiments, said processing unit is further configured for calculating a correlation coefficient of at least one of said backscattering patterns of said first span and said backscattering pattern of said second span and comparing the correlation coefficient to a threshold to determine if said second span is the same as said first span.

In accordance with yet another aspect, there is provided a non-transitory computer-readable storage medium comprising instructions that, when executed, cause a processor to perform the steps of:

receiving a set of backscattering patterns obtained over a first span of a first optical fiber link for different values of optical fiber temperatures or different values of OTDR laser center wavelengths, wherein each backscattering pattern corresponds to at least a portion of an OTDR trace acquired over the first span of first optical fiber link;

receiving a backscattering pattern obtained over a second span of a second optical fiber link and corresponding to at least a portion of an OTDR trace acquired over the second span of the second optical fiber link; and comparing the backscattering pattern of said second span to the set of backscattering patterns of said first span to determine if the backscattering pattern of said second span matches one of the backscattering patterns of said set;

wherein said second span is determined to be the same as said first span if a match is found.

In accordance with another aspect, the adapted OTDR employs a polarization scrambler to reduce the signature variability that is due to varying polarization states of light propagating in the optical fiber.

In accordance with yet another aspect, the adapted OTDR employs a broaden laser source to reduce the signature variability that is due to wavelength drift of the OTDR laser source.

Of course, these above two aspects can be combined so as to recognize optical fibers with even more repeatability.

The solutions proposed herein can be used for multiple applications, including MPO polarity detection, continuity detection, etc. For MPO polarity and/or continuity detection, the backscattering pattern can be used as a signature to recognize specific optical fibers of a receive cable and distinguish each fiber of the receive cable from one another, thereby replacing complex and costly discrete reflective signatures by a simple segment of optical fiber such as, e.g. SMF-28 fiber.

The proposed solutions can also be used for matching bidirectional OTDR traces. More specifically, in the case, e.g., of MPO or other multiple fiber links, OTDR signatures recognition can be used to match OTDR traces acquired from different ends of a same optical fiber link in order to perform the bidirectional OTDR analysis therefrom. The proposed solutions can also be used for detecting fiber segments in a multi-point optical fiber network. For example, in the case of dynamic switching, signature recognition can be used to find in which route is located a specific fiber segment. Furthermore, signature recognition can be used to check if a newly inserted fiber segment was inserted at the expected location. More generally, it can be used as a fiber identification tool, i.e., whenever a pre-characterized optical fiber segment it can be later found from any remote location.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

Further features and advantages of the present invention will become apparent to those of ordinary skill in the art upon reading of the following description, taken in conjunction with the appended drawings.

BRIEF DESCRIPTION OF THE DRAWINGS

FIG. 7A illustrates the method and system in accordance a first strategy wherein each signature is pre-characterized over a range of temperatures or center wavelengths. FIG. 7B illustrates the method and system in accordance with a second strategy wherein each signature may be pre-characterized at a single temperature and, during measurement, the OTDR laser is tuned until a match is found.

Figure 1:
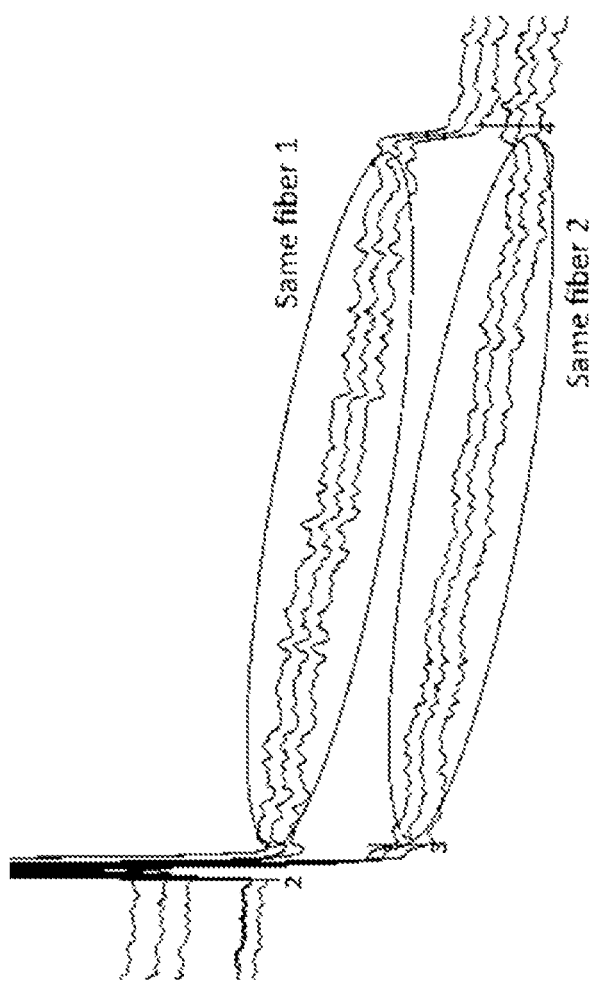
FIG. 1 is a graph illustrating OTDR traces as obtained with OTDR acquisitions repeated over the same fiber 1, compared with those repeated over another same fiber 2.

It will be noted that throughout the drawings, like features are identified by like reference numerals. To not unduly encumber the figures, some elements may not be indicated in some figures if they were already identified in a preceding figure. It should be understood herein that elements of the drawings are not necessarily depicted to scale. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments

DETAILED DESCRIPTION

FIG. 1 shows a graph illustrating OTDR traces as obtained with OTDR acquisitions repeated over the same fiber 1, compared with those obtained with OTDR acquisitions repeated over another same fiber 2.

The manufacturing process of optical fibers produces small fluctuations in the optical fiber structure along any segment of optical fiber. When such fluctuations interact with the OTDR test pulses, it creates interferences and modulations that produce a backscattering pattern in the acquired OTDR trace.

As can be seen in FIG. 1, when OTDR measurements are repeated over the same optical fiber 1, a similar backscattering pattern is found. However, because the structural fluctuations along optical fibers are random, OTDR measurements performed on a different optical fiber 2 show a different backscattering pattern. The backscattering pattern can therefore be used as a signature to recognize optical fibers which signatures were pre-characterized.

As such, optical fibers can be recognized by comparing the acquired OTDR traces, and more specifically, the backscattering pattern associated with a given fiber span along the OTDR trace, which correspond to a continuous optical fiber section where backscattering is typically dominant over reflections and electronic noise.

The backscattered light may be described as the coherent superposition of the light generated by many weak reflectors, randomly spread in the fiber. Each of these reflectors can be described by means of Rayleigh's theory, according to which the backscattered light is in phase with the incident one and has the same polarization. However, the intensity of the light reflected by the single scattering center is a random quantity, because so are density fluctuations.

The complex envelope, b(t), of the backscattered light in a single mode fiber can be described by the following expression:

$$b(t) = \sum_n c_n e^{-2[\alpha(z_n)+j\beta z_n]} a(t - 2\tau_n), \qquad (1)$$

where $\beta$ is the propagation constant of the fiber, $\alpha(z)$ describes the attenuation accumulated up to z, $c_n$ and $z_n$ are the random amplitude and position of the nth scattering center, $\tau_n$ is the group delay introduced by the propagation up to $z_n$, the factor 2 takes in to account roundtrip propagation, and a(t) is the complex envelope of the test signal used to probe the fiber (see P. Gysel and R. K. Staubli, "Statistical properties of Rayleigh backscattering in single-mode fibers," in *Journal of Lightwave Technology*, vol. 8, no. 4, pp. 561-567, April 1990).

Note that these values representing the scattering elements of the fiber can be considered constant as long as the fiber is not perturbed.

We herein define the "Coherent Rayleigh Noise" (CNR) in the backscattered light b(t) as the noise that is inherent to Rayleigh backscattered radiation and is due to the interference among the large number of lightwaves backscattered at different positions in the fiber and thereby causing phase-intensity noise conversion.

The Coherent Rayleigh Noise manifests itself during OTDR measurement, as a "backscattering pattern" in the measured OTDR trace.

A coherent OTDR can be used to measure the backscattering light b(t). The acquired OTDR signal is then equivalent to the convolution of the backscattering light b(t) with the OTDR signal pulse function:

$$S(t) = b(t) * \text{pulse}_T(t) \quad (2)$$

wherein S(t) is the measured signal, which is a complex signal; and $\text{pulse}_T(t)$ represents the OTDR signal pulse function for a pulse length T.

The same applies to conventional (i.e., non coherent) OTDR except that in the case of a non-coherent receiver, what is measured is the intensity of the backscattered light:

$$|S(t)|^2 = |b(t) * \text{pulse}_T(t)|^2 \quad (3)$$

From these equations, we find that:
The model of the fiber is a linear superposition of distributed random stable scatters along the fiber
The signal received by an OTDR is the intensity of the convolution of the OTDR signal pulse function with the interferences of the pulse light wavelength with backscatter sections of the fiber
A conventional OTDR measures the intensity of the interference pattern from the backscattered light The backscattering pattern as measured with a conventional (i.e., non-coherent) OTDR represents an interference pattern resulting from the combination of the fiber structure and the OTDR signal pulse function and spectrum. The backscattering pattern is subject to change with the following factors:
The temperature of the optical fiber
A mechanical stress in the optical fiber or a vibration
The central wavelength of the OTDR pulsed light source
The spectral width and spectral function of the OTDR pulsed light source
The OTDR signal pulse function (the pulse width acting as a filter)
The direction of light propagation in the optical fiber
The polarization state of the OTDR light source (a change in polarization may add a noise floor to the backscattering pattern in case of rotation anywhere before the analyzed RBS section).

A given backscattering pattern measured by a conventional OTDR is therefore repeatable under the following conditions:
There are no modifications to the external conditions of the optical fiber under test, i.e., no temperature change, mechanical stress or vibration
The OTDR acquisition conditions are the same, i.e., same pulse response and same central wavelength, spectral width and optical frequency components of the OTDR pulsed light source As will be described hereinbelow, OTDR traces acquired with different pulse responses may be corrected to have the same effective pulse responses by convoluting the OTDR trace that was acquired with the shorter pulse, with a corrective pulse response, in order to mimic such a longer pulse. For example, the OTDR trace that was acquired with the shorter pulse may be convoluted with the pulse response of the longer pulse, whereas the OTDR trace that was acquired with the longer pulse is convoluted with the pulse response of the shorter pulse.

As such, under conditions that are stable enough, each optical fiber has a unique signature and any backscattering pattern that is long enough can be used as a fiber signature.

Effect of Laser Linewidth and Pulsewidth on the Backscattering Pattern:

As explained hereinabove, the pulse length T impacts the amplitude of the backscattering pattern as measured, and so is the laser linewidth.

The fraction ($f_{CRN}$) of the Coherent Rayleigh Noise (CRN) (inherent to the optical fiber) which manifests in the OTDR trace as a backscattering pattern and is available for use as a signature is defined as ratio of the standard deviation of the amplitude of the measured backscattering pattern to that of the Coherent Rayleigh Noise and is given as (see K De Souza, "Significance of coherent Rayleigh noise in fibre-optic distributed temperature sensing based on spontaneous Brillouin scattering", in *Measurement Science and Technology*, vol. 17, pp. 1065-1069, April 2006):

$$f_{CRN} \approx \left(\frac{V_g}{4\Delta z \Delta v}\right)^{1/2} \quad (4)$$

wherein $V_g$ is the group velocity, $\Delta z$ is the OTDR pulse length and $\Delta v$ is the laser linewidth.

Figure 3:
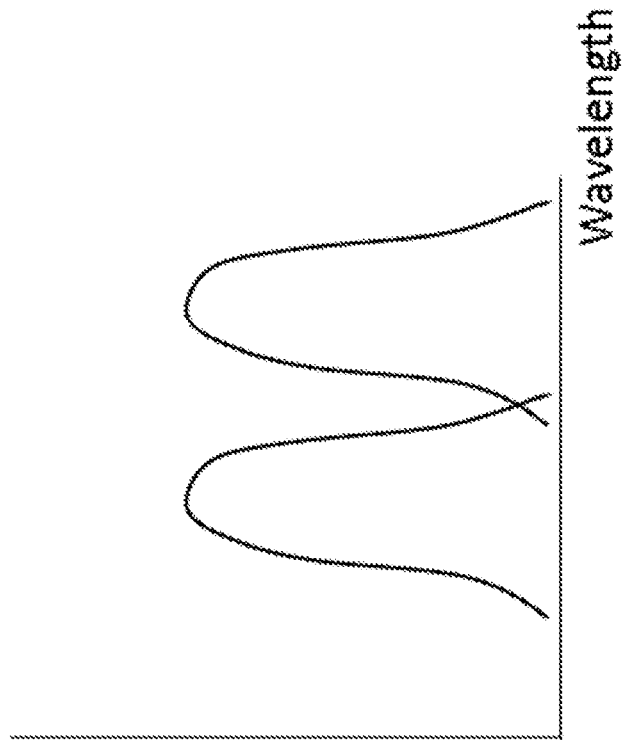
FIG. 3 is a graph illustrating a very weak spectral overlap between the OTDR laser sources used in two OTDR acquisitions, which will produce different signatures and a low signature correlation.
Figure 2:
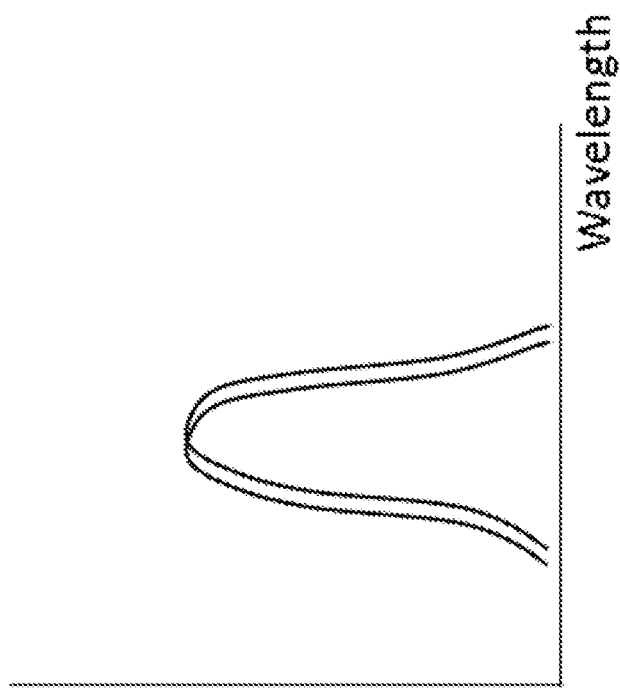
FIG. 2 is a graph illustrating a strong spectral overlap between the OTDR laser sources used in two OTDR acquisitions, which will yield a good signature correlation.
Figure 4:
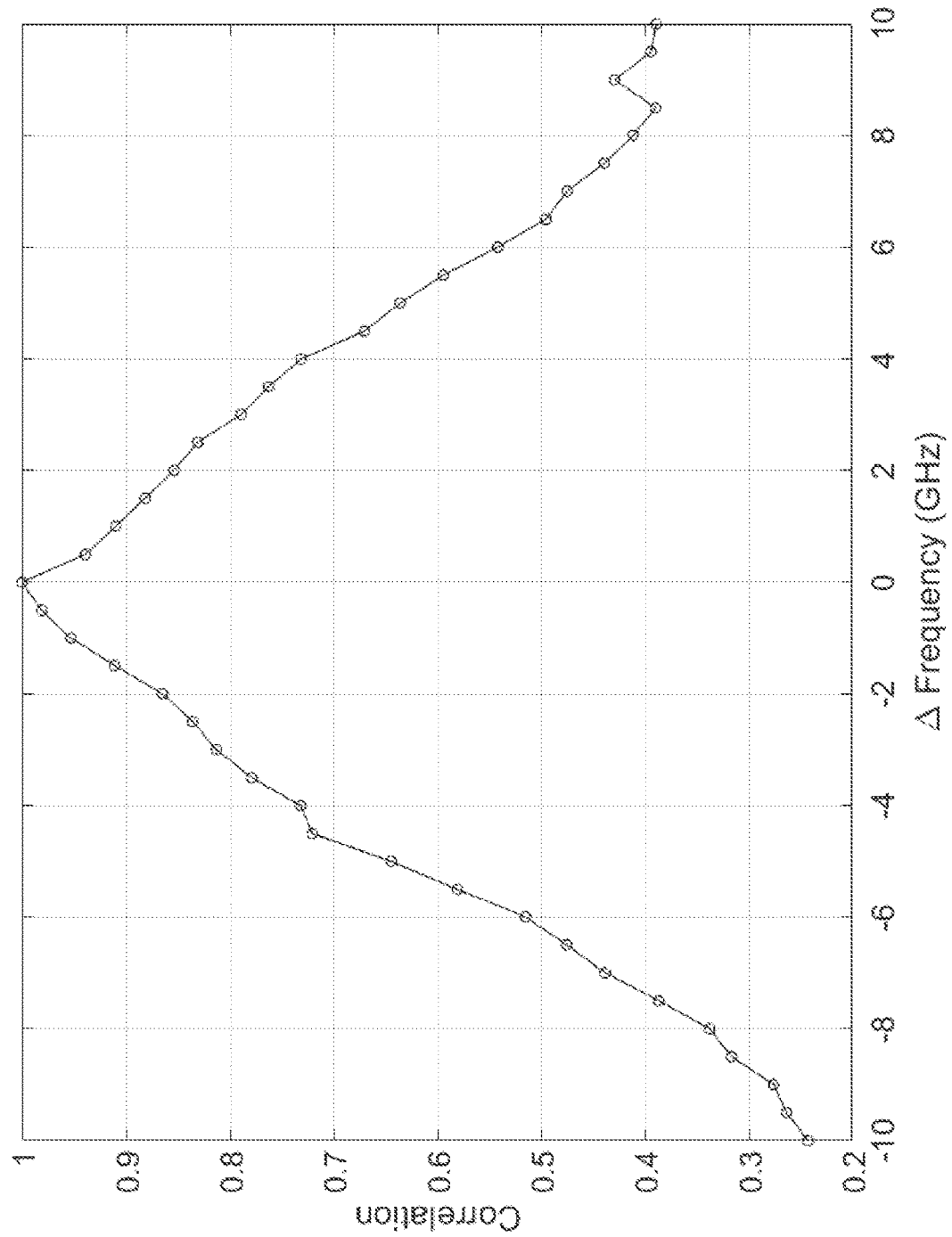
FIG. 4 is a graph showing how the correlation between measured backscattering patterns may drops as a function of a frequency offset of the OTDR laser sources.

This equation explains that the laser linewidth affects the measured backscattering pattern. Consequently, to recognize a signature under stable optical fiber conditions (no temperature change) the OTDR laser source of both measurements should have the same center wavelength and the same spectral width. But in reality, the signature correlation is proportional to the spectral overlap when assuming the fiber is not perturbed (temperature change, etc.). Referring to FIG. 2, a strong spectral overlap between the OTDR laser sources used in two OTDR acquisitions will yield a good signature correlation. Referring to FIG. 3, non-overlap of the spectral width will produce different signatures that will yield a low signature correlation and may not allow to recognize the optical fiber. FIG. 4 shows how the correlation between measured backscattering patterns may drop with a frequency offset of the OTDR laser source.

The reproducibility of backscattering patterns is therefore sensitive to the central wavelength and the spectral width of the OTDR laser source. Reproducibility may be improved by employing larger OTDR laser linewidth to reduce the signature variability that may be due to wavelength drift of the OTDR laser source. The spectral width of the source may be selected to be a few times larger (e.g., 5 to 10) than the expected wavelength stability. For example, if the source center wavelength can be stabilized to about ±1 GHz, the target spectral width of the OTDR laser source may be about 5 to 10 GHz.

From the above equation, the fraction $f_{CRN}$ of the Coherent Rayleigh Noise which manifests in the OTDR trace as a backscattering pattern is inversely proportional to the OTDR pulsewidth and the OTDR laser linewidth. The broader the pulsewidth and the larger the laser linewidth, the lower the amplitude of the measured backscattering pattern. A spectral width of the OTDR laser source that would be too large may therefore be detrimental because it would reduce the amplitude of the backscattering pattern. A balance may therefore have to be found between the amplitude of the measured backscattering pattern and its repeatability.

Figure 5:
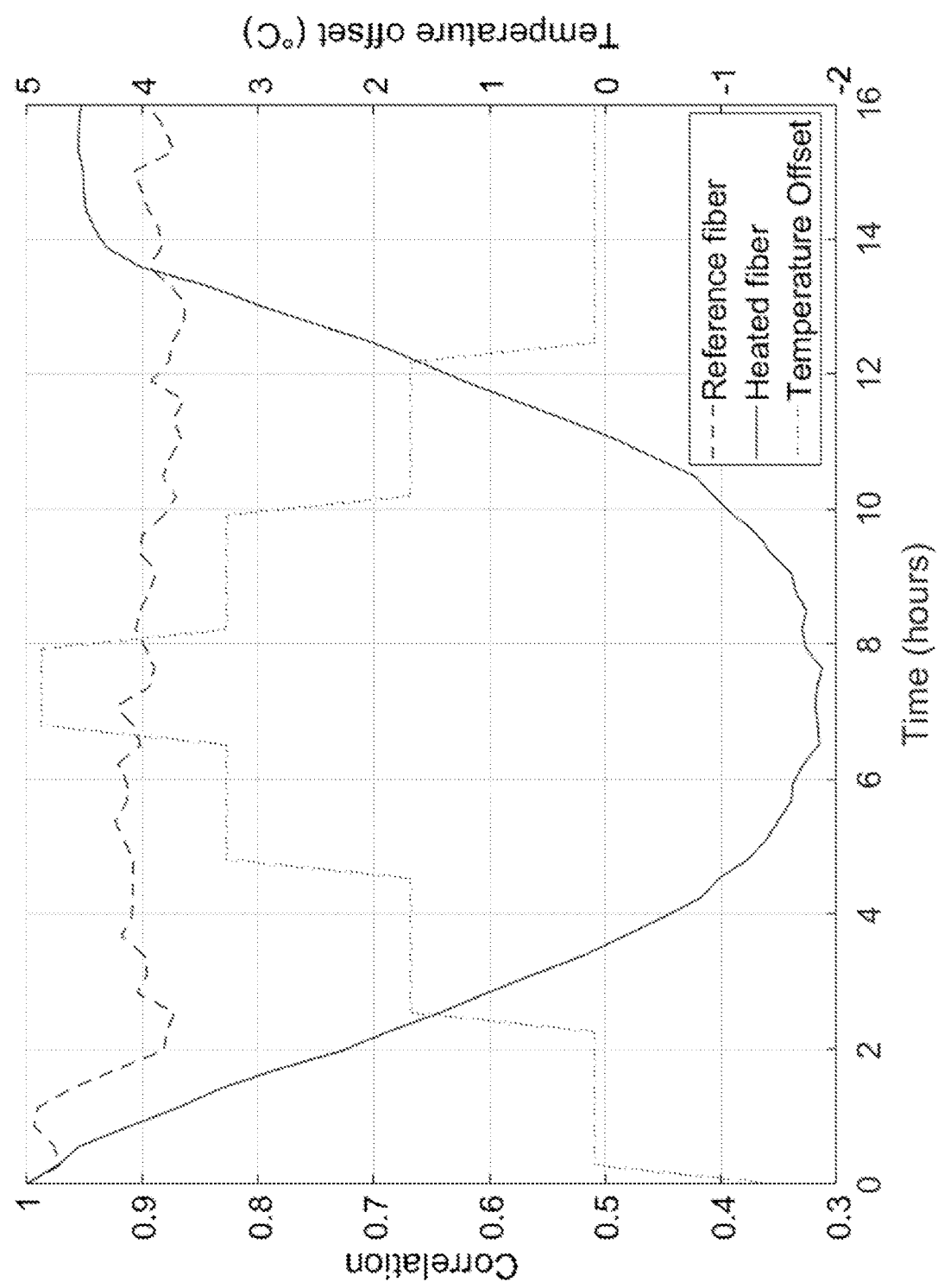
FIG. 5 is a graph showing experimental results in which, on the left scale, the correlation coefficient obtained by comparing backscattering patterns acquired over the same optical fiber, but which is subject to varying temperatures, wherein the temperature offset is shown on the right scale (varying from 0 to 5° C.).

Temperature Variations:

Referring to FIG. 5, it is shown that variations of the temperature of the optical fiber also modify the backscattering pattern. A correlation is calculated between a reference backscattering pattern obtained at reference temperature of 25° C. and backscattering patterns obtained with temperature variations from 0 to 5° C. It was found that the correlation is significantly weaker with greater temperature variations. This is explained by the refraction index which changes as a function of temperature, thereby modifying the delays between scatters and changing the backscattered light b(t). This change is similar to a scaling, i.e., a modification of the length of optical fiber.

Figure 6:
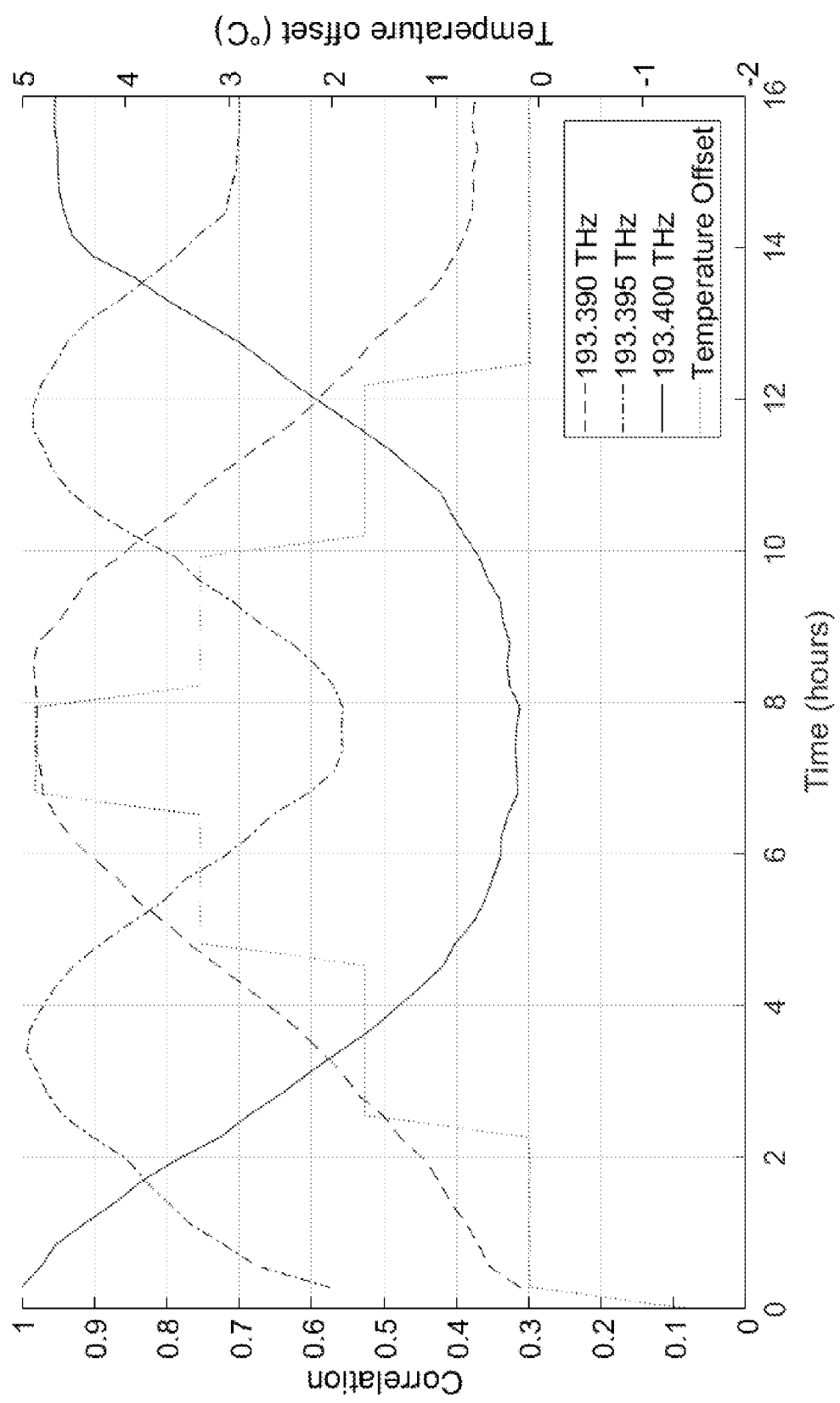
FIG. 6 is a graph showing experimental results for which backscattering patterns measured at different frequencies are compared to backscattering patterns obtained at a reference frequency of 193.4 THz, while progressively varying the temperature of the optical fiber, wherein the correlation coefficient is shown on the left scale and the temperature offset is shown on the right scale (varying from 0 to 5° C.).

FIG. 6 shows experimental results for which backscattering patterns measured at different frequencies are compared to backscattering patterns obtained at a reference frequency of 193.4 THz, while progressively varying the temperature of the optical fiber. The temperature offset is shown on the right scale (varying from 0 to 5° C.) and the correlation is shown on the left scale. The correlation vs the temperature for different frequency offsets shows that the temperature change can be compensated by offsetting the center frequency (or wavelength) of the OTDR laser source. For example, a −10 GHz offset brings a correlation close to 1 for a 5° C. temperature offset.

Experiments have therefore shown that a change in the center wavelength of the OTDR laser source is substantially equivalent on the backscattered light b(t) to a change in the optical fiber temperature. Therefore, slightly tuning the laser source wavelength may allow to recover the backscattering pattern obtained at a different temperature. The pattern observed at fiber temperature T1 and wavelength $\lambda 1$ can be reproduced at fiber temperature T2 and wavelength $\lambda 2$, wherein T1≠T2 and $\lambda 1 \neq \lambda 2$.

Temperature Correction

One of the methods proposed herein for comparing OTDR signatures for optical fiber recognition involve a correction to compensate for temperature-induced changes of the backscattering pattern. Such temperature correction takes advantage of the above-described behavior to manage temperature variations of the optical fiber under test.

In accordance with a first strategy, the stored signature for each pre-characterized optical fiber comprises a set of backscattering patterns measured at different temperature set points over a range of temperatures and/or a set of backscattering patterns measured for different slightly drifted center wavelengths of the OTDR laser source over a range of center wavelengths. An optical fiber signature to be recognized comprises a backscattering pattern acquired at any temperature within the range and potentially using a slightly drifted center wavelength of the OTDR laser. The signature can then be recognized by comparing its backscattering pattern to each prerecorded backscattering pattern of the set of recorded signatures to find a match. The backscattering pattern is recognized when a correlation is found with any one of the backscattering patterns of a given signature.

In this case, a previous signature characterization step may be required in order to record the stored signature(s). OTDR acquisitions are performed over the optical fiber to be recognized for varying OTDR laser center wavelengths $\lambda_n$, in order to simulate a laser or temperature drift. The wavelength range over which to characterize each optical fiber may correspond to the desired operating temperature range (e.g., 23° C.±5° C.), the wavelength dependency being around 1 GHz/° C. The laser wavelength steps to enable pattern interpolation and matching may be around ¼ of the OTDR laser spectral width (e.g., about 1 GHz for a laser spectral width of 4 GHz).

In accordance with a second strategy, the stored signature for each pre-characterized optical fiber may comprise a single backscattering pattern acquired at a single temperature and single center wavelength of the OTDR laser source (or a limited number of backscattering patterns). Then, when later trying to recognize an optical fiber signature, if the measured backscattering pattern does not match any of the stored signature(s), OTDR acquisitions are repeated with slightly drifted center wavelengths of the OTDR laser source to obtain a set backscattering patterns for the optical fiber to be recognized. The comparison process is repeated until a match is found with any of the stored signature(s). The optical fiber is recognized when a match is found.

In some conditions, an OTDR laser source equipped with a thermoelectric cooler or similar device may provide enough tuning range to cover expected fiber temperature variation. In other embodiments, the OTDR device may comprise a tunable laser. The tuning range required will depend on the temperature range of the fiber that needs to be covered.

Figure 7A:
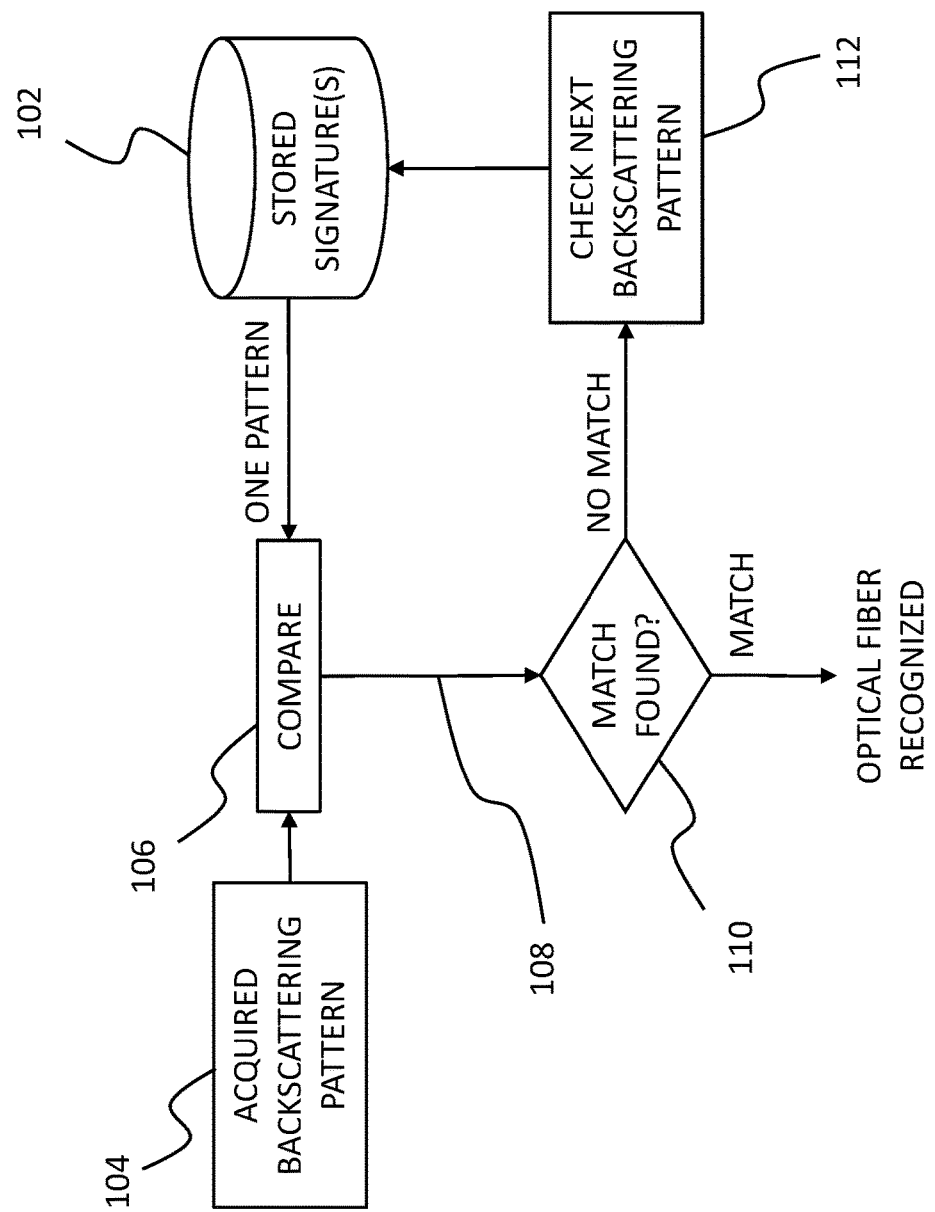
FIGS. 7A and 7B are graphs illustrating methods and systems for comparing OTDR signatures to recognize an optical fiber.
Figure 7B:
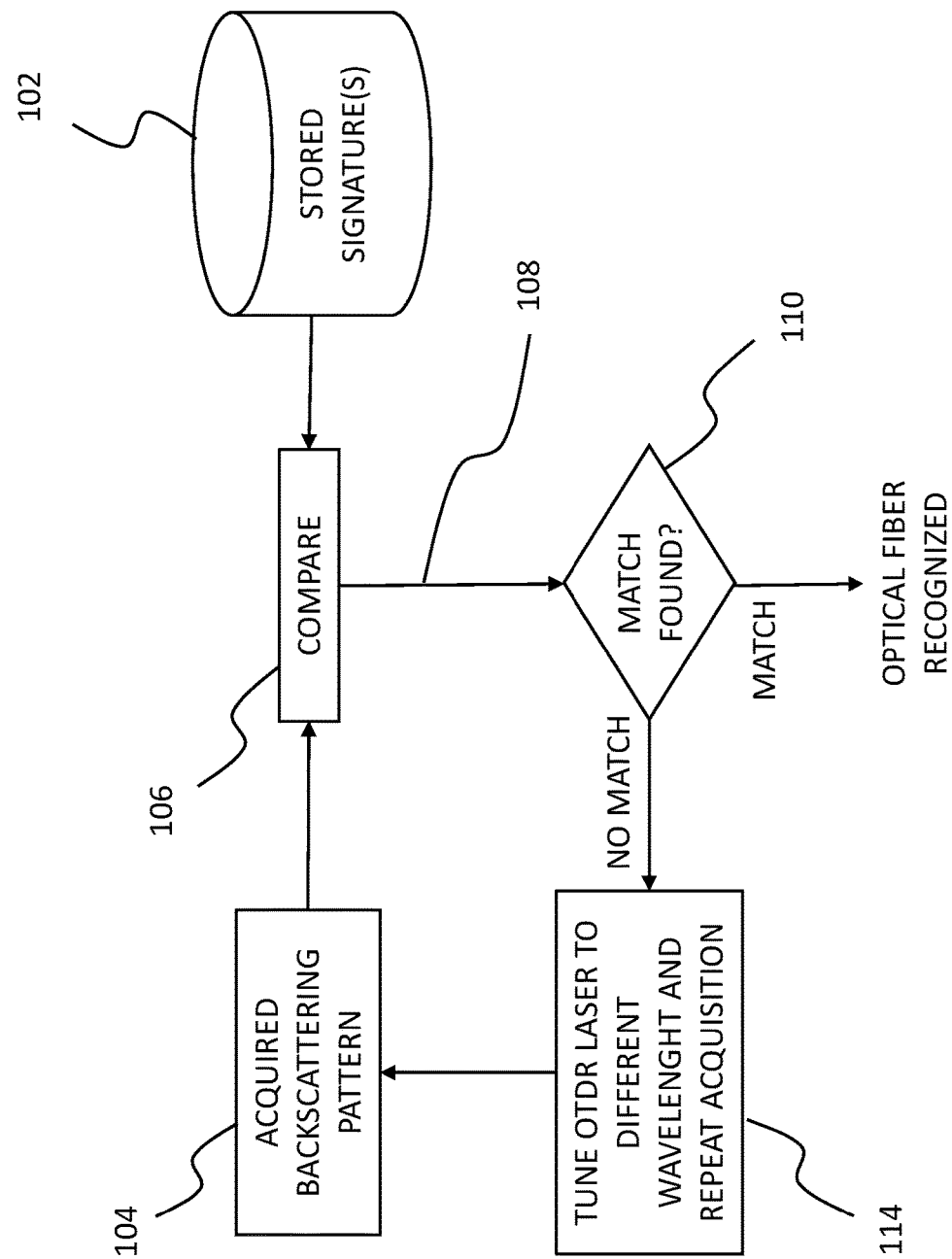

Signature Matching Process:

FIGS. 7A and 7B illustrate methods and systems for comparing OTDR signatures to recognize an optical fiber. The methods of FIGS. 7A and 7B may be embodied, e.g., in a signature recognition module, which may be implemented, e.g., in a server-based application or in a processing unit integrated in an OTDR device (as described hereinbelow).

FIG. 7A illustrates the method and system in accordance with the first strategy described hereinabove, whereas FIG. 7B illustrates the method and system in accordance with the second strategy described hereinabove.

Referring to FIG. 7A, the method and system involve a data storage 102 where at least a first set of prerecorded backscattering patterns corresponding to an optical fiber signature is stored. A set of backscattering patterns should therefore be built prior to the operation of the matching process. Each signature is obtained from prior OTDR acquisitions over an optical fiber link comprising a given optical fiber span to be later used to recognize an optical fiber. Each signature may comprise backscattering patterns measured over a sub-portion of optical fiber link over which an OTDR trace was acquired, and which corresponds to the given optical fiber span. In other cases, the backscattering patterns may cover the whole optical fiber link. The signature comprises a plurality of backscattering patterns measured for different values of optical fiber temperatures or different values of OTDR laser center wavelengths. Of course, each signature may be associated to a unique identification number used to identify its corresponding optical fiber link or optical fiber span.

The signature recognition module receives, as an input, a backscattering pattern 104 acquired over at least one span of an optical fiber to be recognized. The backscattering pattern 104 typically corresponds to at least a portion of an OTDR trace acquired over an optical fiber link. In typical applications, the optical fiber link may comprise, e.g., a launch fiber, an optical fiber under test and a receive fiber. Therefore, in some embodiments, the relevant optical fiber span to be recognize may correspond, e.g., to the launch fiber or a portion thereof, to the receive fiber or a portion thereof or to the optical fiber under test or a portion thereof.

A comparison engine 106 compares the signature 104 to be recognized to the signatures stored in data storage 102, in order to find a match. For example, the backscattering pattern 104 to be recognized is first compared to one of the stored backscattering patterns and outputs a comparison value 108.

For example, one backscattering pattern among the set of signatures may be recognized by calculating a cross-correlation between at least a portion of the OTDR trace and the one backscattering pattern among said set and calculating a correlation coefficient 108. The comparison may further involve searching along the acquired OTDR trace for a fiber span that matches the one of the stored backscattering patterns.

In step 110, the correlation coefficient 108 may be compared to threshold in order to determine if the backscattering pattern 104 matches the one of the stored backscattering patterns. If a match is found, the fiber span over which the backscattering pattern 104 was acquired is found to be the same as that corresponding to the stored signature and the optical fiber is recognized. In step 112, if no match is found, the method moves a next one of the stored backscattering patterns and the backscattering pattern 104 to be recognized is compared to the next one of the stored backscattering patterns, until a match is found or all stored backscattering patterns are compared without a match. If no match is found, the fiber span over which the backscattering pattern 104 was acquired is found to not be the same as that corresponding to the stored signature and the optical fiber is not recognized.

Referring to FIG. 7B, the method and system involve a data storage 102 where at least one prerecorded backscattering pattern corresponding to an optical fiber signature is stored. The backscattering pattern should therefore be acquired prior to the operation of the matching process. The signature is obtained from prior OTDR acquisition over an optical fiber link comprising a given optical fiber span to be later used to recognize an optical fiber. It may comprise the backscattering pattern measured over a sub-portion of optical fiber link which corresponds to the given optical fiber span. In this case, a single backscattering pattern may be recorded for a given signature. Of course, the data storage 102 may comprise multiple signatures (corresponding to different optical fiber links) which may each be associated to a unique identification number used to identify its corresponding optical fiber link or optical fiber span.

The signature recognition module receives, as an input, a backscattering pattern 104 acquired over at least one span of an optical fiber to be recognized. The backscattering pattern 104 typically corresponds to at least a portion of an OTDR trace acquired over an optical fiber link. In typical applications, the optical fiber link may comprise, e.g., a launch fiber, an optical fiber under test and a receive fiber. Therefore, in some embodiments, the relevant optical fiber span to be recognize may correspond, e.g., to the launch fiber or a portion thereof, to the receive fiber or a portion thereof or to the optical fiber under test or a portion thereof.

A comparison engine 106 compares the signature 104 to be recognized to a signature stored in data storage 102, in order to find a match. For example, the backscattering pattern 104 to be recognized is compared to a stored backscattering pattern and outputs a comparison value 108.

For example, optical fiber signatures may be recognized by calculating a cross-correlation between at least a portion of the acquired OTDR trace 104 and the pre-recorded backscattering pattern 102 and calculating a correlation coefficient 108. The comparison may further involve searching along the acquired OTDR trace for a fiber span that matches the stored backscattering pattern.

In step 110, the correlation coefficient 108 may be compared to threshold in order to determine if the backscattering pattern 104 matches the stored backscattering pattern. If a match is found, the fiber span over which the backscattering pattern 104 was acquired is found to be the same as that corresponding to the stored signature and the optical fiber is recognized. In step 114, if no match is found, the method tunes the OTDR laser source of the OTDR acquisition device used to acquire the backscattering pattern 104 to a different value of laser center wavelength to perform another OTDR acquisition and the next acquired backscattering pattern 104 is compared to the stored backscattering pattern 102, until a match is found or until the tuning range of the OTDR laser source is reached without a match. If no match is found, the fiber span over which the backscattering pattern 104 was acquired is found to not be the same as that corresponding to the stored signature and the optical fiber is not recognized.

Now referring to the methods and systems of both FIGS. 7A and 7B, in some embodiments, the set of signatures 102 may correspond to pre-characterized receive fibers. In such case, the comparison engine 106 may search for the backscattering pattern along an end portion only of the OTDR trace, where the receive fiber is expected to be found. For example, a cross-correlation may be calculated between one backscattering pattern of the set of signatures 102 and an end portion of the OTDR trace.

It is noted that some processing may be performed to extract a backscattering pattern from an acquired OTDR trace. For example, the backscattering pattern may be obtained by subtracting the backscattering slope and/or the offset from the OTDR trace over the relevant fiber span to be recognized, or applying some other filtering to remove low bandwidth components. However, in other embodiments, it may be possible to directly use the OTDR trace over the relevant fiber span as the backscattering pattern (including the backscattering slope and offset), depending on the specific calculation being implemented for the backscattering pattern comparison.

In one embodiment, the backscattering patterns are obtained directly from the OTDR trace along the fiber span and are normalized in terms of offset (e.g. the offset is subtracted on both traces). The RMS value of the difference between the backscattering pattern functions is then calculated and output as the comparison value 108, whereby lower RMS values indicate a higher degree of similarity and vice versa.

In another embodiment, the backscattering patterns are obtained by removing the backscattering slope and offset from the respective OTDR traces over the fiber span. The backscattering patterns are then compared by calculating the comparison value 108 as the correlation coefficient of the backscattering patterns of the first and the second backscattering patterns. A value of the correlation coefficient is thereby indicative of a likelihood of the first and the second backscattering patterns being acquired over the same optical fiber span.

A correlation coefficient between two functions may be calculated as the mean of the vector products divided by a normalization factor:

$$\rho_{X,Y} = \text{corr}(X, Y) = \frac{\text{cov}(X, Y)}{\sigma_X \sigma_Y} = \frac{E[(X - \mu_X)(Y - \mu_Y)]}{\sigma_X \sigma_Y}$$

where $\lambda$ and Y are vectors contain the backscattering patterns to be compared (backscattering slope removed).

The absolute value of the resulting correlation coefficient lies between 0 and 1. The closer to 1 is the correlation coefficient, the more similar are the backscattering patterns (a correlation coefficient of −1 would indicate an inverse copy, which is not plausible in this context).

The correlation coefficient is typically lower than 1 because the backscattering patterns fluctuates due to the presence of electronic noise and fluctuations in time of the characteristics of the OTDR test pulses (polarization state, wavelength and/or spectral shape). Despite these limitations, when the ratio of backscattering pattern amplitude to electronic noise is greater than a given threshold of about 10, it is found that a correlation factor greater than about 0.7 indicates that the backscattering patterns match.

In yet another embodiment, any potential position offset between two backscattering patterns to be compared may be accounted for by calculating a cross-correlation instead of a correlation. The cross correlation will identify the best alignment to reach the greatest correlation coefficient.

A decision logic 110 determines whether the backscattering patterns compared by the comparison engine 106 match or not, from a comparison value 108. In one embodiment, the correlation coefficient is compared to a correlation threshold such that backscattering patterns are determined to match if a correlation coefficient is greater than or equal to the correlation threshold such as, e.g., 0.5 or 0.7.

Figure 8:
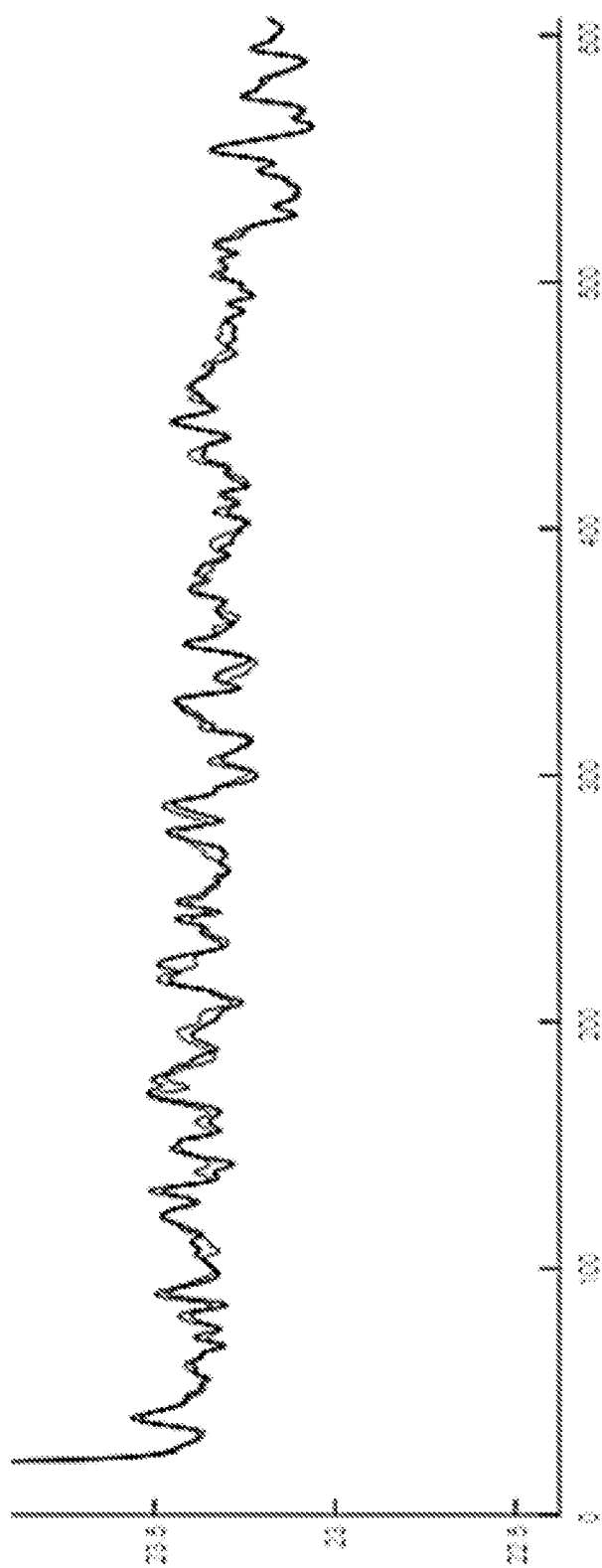
FIG. 8 is a graph showing an example of two backscattering patterns acquired over the same optical fiber and for which the calculated correlation coefficient is 85%.

For instance, FIG. 8 shows an example of two backscattering patterns acquired over the same optical fiber (corresponding respectively to a pre-recorded signature 102 and an acquired backscattering pattern 104) and for which the calculated correlation coefficient is 85%.

In one embodiment, when the comparison value 108 meets the correlation threshold, the signature recognition module outputs the identification number corresponding to the backscattering pattern that is found to match, among those stored in data storage 102.

If the comparison value 108 does not meet the correlation threshold, the process may be repeated with another backscattering pattern or another signature from the database until a match is found.

Bidirectional Measurements—Reverse Pattern

Referring to equations (2) and (3), convolution is not a symmetric operator. This implies that the backscattering pattern measured from one end of an optical fiber is different from that measured from the other end. Therefore, in some applications where the backscattering patterns 102 and 104 are not acquired from the same end of the optical fiber to be recognized, some processing may be needed to reverse one backscattering pattern before comparison.

In one embodiment, the reversed backscattering pattern may simply be obtained by applying a mirror function (f′(x)=f(L−x)) to the acquired backscattering pattern.

However, a backward backscattering pattern, i.e., as would be measured in the backward direction, mirrors the forward backscattering pattern, with the exception that the samples are filtered with an anti-causal filter as a result of the OTDR transfer function. But because convolution is a linear operator, it is possible to retrieve the same pattern from OTDR acquisitions performed from both sides of an optical fiber, by processing the OTDR traces.

Therefore, in another embodiment, the correlation between the patterns may be improved by compensating the changes in transfer functions. This can be done by performing a convolution on both patterns with the reversed OTDR transfer function. Therefore, the backwardly-measured backscattering pattern is reversed by 1) convoluting the backscattering pattern with the reversed OTDR transfer function and 2) applying a mirror function (f′(x)=f(L−x)). The reversed backscattering pattern can then be compared with the forwardly measured backscattering pattern as convoluted with the reversed OTDR transfer function.

Comparing OTDR Traces Acquired with Different Pulsewidths or Sampling:

Comparing backscattering patterns is simpler to apply when the two OTDR traces to compare are acquired with the same OTDR conditions, including the same pulse width and the same sampling resolution. However, in practical cases, all OTDR traces may not always be acquired with the same conditions, e.g., if the OTDR device has an automatic OTDR condition selection mode in single pulse width and multi-pulsewidth acquisitions. In this case, a preliminary data preparation step may be needed. Using known signal processing techniques, the OTDR trace acquired with the greatest sampling resolution may be resampled to match the sampling resolution of the other. Furthermore, because longer pulses have a smoothing effect on the backscattering pattern, the correlation process may further be improved by filtering the OTDR trace acquired with the smallest pulses to match the response of the larger pulses. One method to compensate for the pulse length difference is to by performing a convolution of the OTDR trace acquired with the shortest pulse with a filter that is equivalent to the pulse length of the longest pulse. After this preprocessing, the two OTDR traces have the same equivalent resolution and can be better compared. In this case, the correlation threshold may optionally be adjusted to account for a correlation penalty induced by different acquisition conditions.

Polarization Noise:

A Polarization noise can affect the backscattering pattern. The backscattering pattern tends to vary with the polarization states of light propagating in the optical fiber when the optical system or the optical fiber under test exhibits high polarization dispersion properties, thereby introducing a polarization noise. Accordingly, in some embodiments, the OTDR acquisition device used for the signature recognition may comprise a polarization scrambler (see 1080 in FIG. 10) to scramble the polarization state of the OTDR laser source. The use of a polarization scrambler reduces the variability of the backscattering pattern that is due to varying polarization states of light propagating in the optical fiber. Polarization scrambling is optional because, in some cases, the polarization noise can be neglected, e.g., if the DUT does not exhibit excessive polarization mode dispersion.

Example of OTDR Device Architecture

Figure 9:
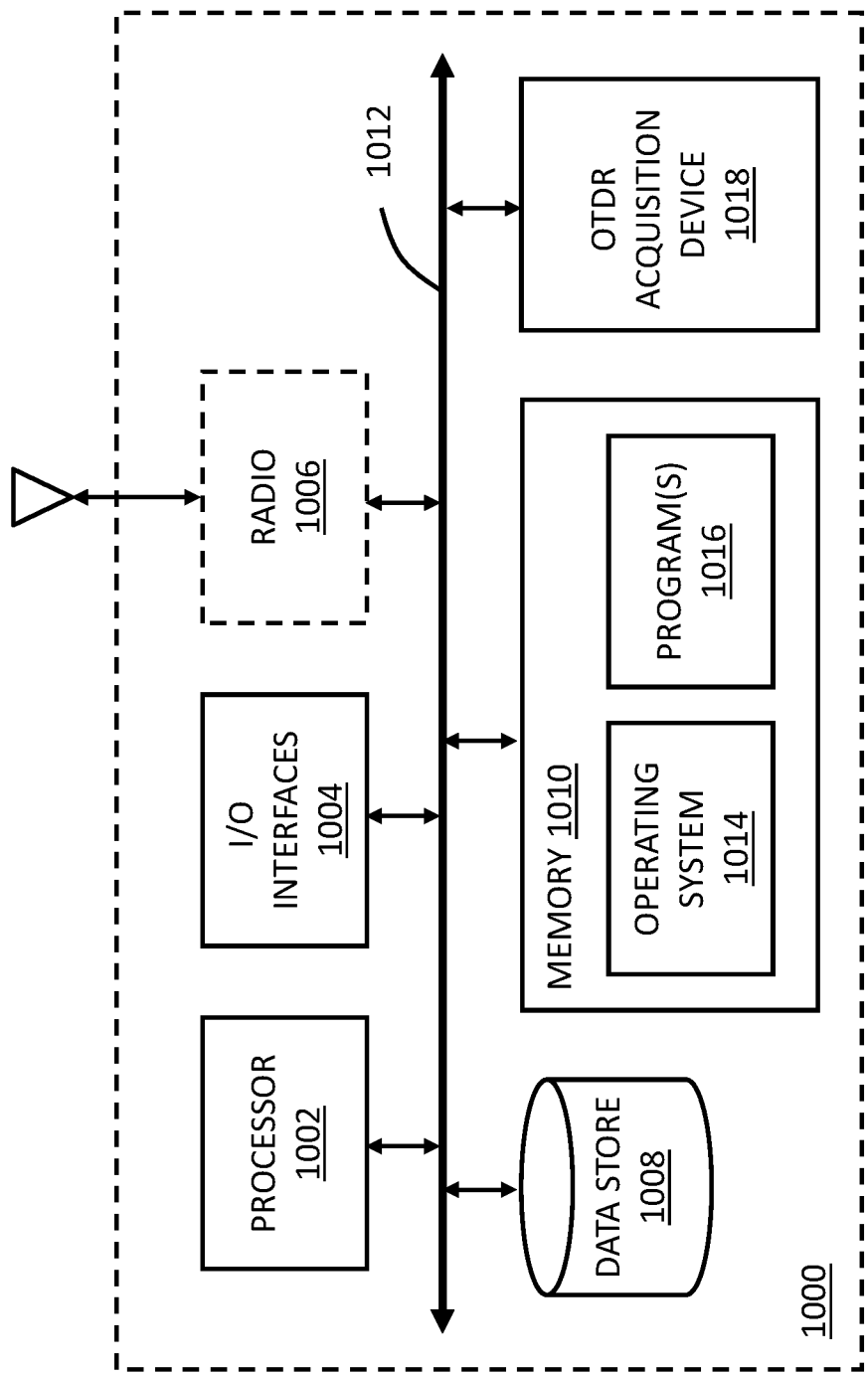
FIG. 9 is a block diagram illustrating an example architecture of an OTDR device of the system of FIG. 1.

FIG. 9 is a block diagram of an OTDR device 1000 which may embody anyone of the methods described herein. The OTDR device 1000 may comprise a digital device that, in terms of hardware architecture, generally includes a processor 1002, input/output (I/O) interfaces 1004, an optional radio 1006, a data store 1008, a memory 1010, as well as an optical test device including an OTDR acquisition device 1018. It should be appreciated by those of ordinary skill in the art that FIG. 9 depicts the OTDR device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the OTDR device 1000 is in operation, the processor 1002 is configured to execute software stored within the memory 1010, to communicate data to and from the memory 1010, and to generally control operations of the OTDR device 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the OTDR device 1000 and/or output at least one of the values derived by the processor 1002.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as OTDR traces and OTDR measurement data files and may embody data store 102 of FIGS. 7A and 7B). The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 9, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the OTDR device 1000. For example, example programs 1016 may include a web browser to connect with a server for transferring OTDR measurement data files, a dedicated OTDR application configured to control OTDR acquisitions by the OTDR acquisition device 1018, set OTDR acquisition parameters, analyze OTDR traces obtained by the OTDR acquisition device 1018 and display a GUI related to the OTDR device 1000. For example, the dedicated OTDR application may embody an OTDR analysis module configured to analyze acquired OTDR traces in order to characterize the optical fiber link under test, and produce OTDR measurement data files. It may further embody a signature recognition module comprising a comparison engine configured for comparing the backscattering patterns for optical fiber recognition, as described herein.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the OTDR device 1000 via the radio 106. In such cases, at least some of the programs 1016 may be located in a memory of such a mobile device, for execution by a processor of the physically distinct device. The mobile may then also include a radio and be used to transfer OTDR measurement data files toward a remote test application residing, e.g., on a server.

It should be noted that the OTDR device shown in FIG. 9 is meant as an illustrative example only. Numerous types of computer systems are available and can be used to implement the OTDR device.

Example of OTDR Acquisition Device Architecture

Figure 10:
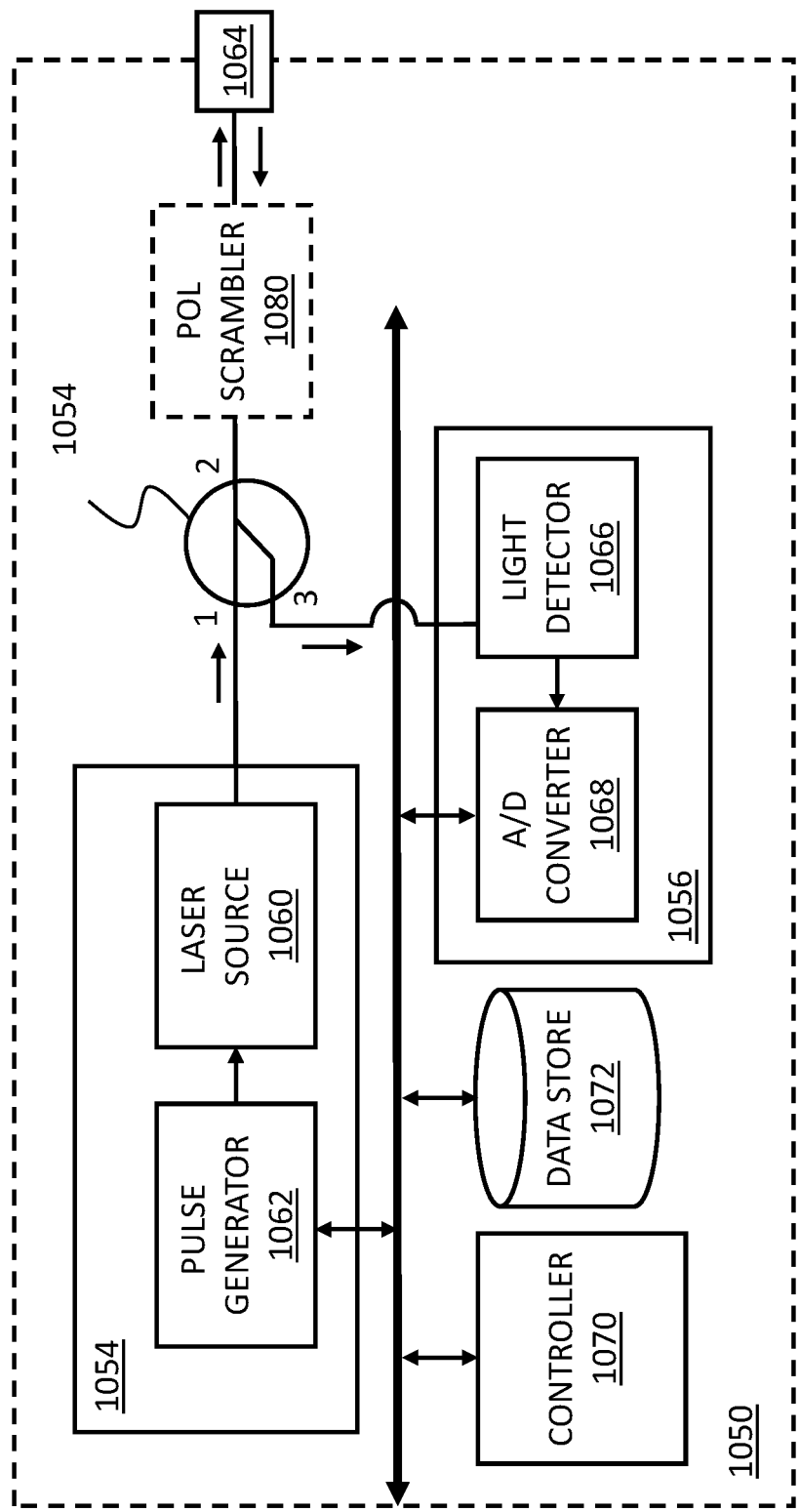
FIG. 10 is a block diagram illustrating an example architecture of an OTDR acquisition device of the OTDR device of FIG. 9.

FIG. 10 is a block diagram an embodiment of an OTDR acquisition device 1050 which may embody the OTDR acquisition device 1018 of the OTDR device 1000 of FIG. 9.

The OTDR acquisition device 1050 is connectable toward the tested optical fiber link via an output interface 1064, for performing OTDR acquisitions toward the optical fiber link. The OTDR acquisition device 1050 comprises conventional optical hardware and electronics as known in the art for performing OTDR acquisitions over an optical fiber link.

The OTDR acquisition device 1050 comprises a light generating assembly 1054, a detection assembly 1056, a directional coupler 1058, as well as a controller 1070 and a data store 1072. It may optionally comprise a polarization scrambler 1080.

The light generating assembly 1054 is embodied by a laser source 1060 driven by a pulse generator 1062 to generate the OTDR test signal comprising test light pulses having desired characteristics. As known in the art, the light generating assembly 1054 is adapted to generate test light pulses of varied pulse widths, repetition periods and optical power through a proper control of the pattern produced by the pulse generator 1062. One skilled in the art will understand that it may be beneficial or required by the application to perform OTDR measurements at various different wavelengths. For this purpose, in some embodiments, the light generating assembly 1054 is adapted to generate test light pulses having varied wavelengths by employing a laser source 1060 that is tunable for example. It will be understood that the light generating assembly 1054 may combine both pulse width and wavelength control capabilities. Of course, different and/or additional components may be provided in the light generating assembly, such as modulators, lenses, mirrors, optical filters, wavelength selectors and the like.

The light generating assembly 1054 is coupled to the output interface 1064 of the OTDR acquisition device 1050 through a directional coupler 1058, such as a circulator, having three or more ports. The first port is connected to the light generating assembly 1054 to receive the test light pulses therefrom. The second port is connected toward the output interface 1064. The third port is connected to the detection assembly 1056. The connections are such that test light pulses generated by the light generating assembly 1054 are coupled to the output interface 1064 and that the return light signal arising from backscattering and reflections along the optical fiber link 110 is coupled to the detection assembly 1056.

The detection assembly 1056 comprises a light detector 1066, such as a photodiode, an avalanche photodiode or any other suitable photodetector, which detects the return light signal corresponding to each test light pulse, and an analog to digital converter 1068 to convert the electrical signal proportional to the detected return light signal from analog to digital in order to allow data storage and processing. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace.

The polarization scrambler 1080 may optionally be included as described herein to scramble the polarization state of the OTDR laser source 1060 before launch into the optical fiber under test, and thereby reduce the variability of the backscattering pattern that is due to varying polarization states of light propagating in the optical fiber.

Of course, the OTDR acquisition device 1050 may also be used to perform multiple acquisitions with varied pulse widths to obtain a multi-pulsewidth OTDR measurement.

The OTDR acquisition device 1050, and more specifically the light generating assembly 1054 is controlled by the controller 1070. The controller 1070 is a hardware logic device. It may comprise one or more Field Programmable Gate Array (FPGA); one or more Application Specific Integrated Circuits (ASICs) or one or more processors, configured with a logic state machine or stored program instructions. When the OTDR acquisition device 1050 is in operation, the controller 1070 is configured to control the OTDR measurement process. The controller 1070 controls parameters of the light generating assembly 1054 according to OTDR acquisition parameters that are either provided by the operator of the OTDR software or otherwise determined by program(s) 1016.

The data store 1072 may be used to cumulate raw data received from the detection assembly 1056, as well as intermediary averaged results and resulting OTDR traces. The data store 1008 may include any of volatile memory elements (e.g., random access memory (RAM, such as DRAM, SRAM, SDRAM, and the like)) or the like and it may be embedded with the controller 1070 or distinct.

The OTDR traces acquired by the OTDR acquisition device 1050 may be received and analyzed by one or more of the computer programs 1016 and/or stored in data store 1008 for further processing.

It should be noted that the architecture of the OTDR acquisition device 1050 as shown in FIG. 10 is meant as an illustrative example only. Numerous types of optical and electronic components are available and can be used to implement the OTDR acquisition device.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The embodiments described above are intended to be exemplary only. The scope of the invention is therefore intended to be limited solely by the appended claims.

The invention claimed is:

1. A method for comparing Optical Time-Domain Reflectometric (OTDR) signatures for optical fiber recognition, the method comprising:
 receiving a set of backscattering patterns obtained over a first span of a first optical fiber link for different values of optical fiber temperatures or different values of OTDR laser center wavelengths, wherein each backscattering pattern corresponds to at least a portion of an OTDR trace acquired over the first span of the first optical fiber link;

receiving a backscattering pattern obtained over a second span of a second optical fiber link and corresponding to at least a portion of an OTDR trace acquired over the second span of the second optical fiber link; and comparing the backscattering pattern of said second span to the set of backscattering patterns of said first span to determine if the backscattering pattern of said second span matches one of the backscattering patterns of said set;

wherein said second span is determined to be the same as said first span if a match is found.

2. The method as claimed in claim 1, wherein said set of backscattering patterns is previously obtained over the first span for different values of optical fiber temperatures and wherein said second span of optical fiber is part of an optical fiber to be recognized.

3. The method as claimed in claim 1, wherein said set of backscattering patterns is previously obtained over the first span for different values of OTDR laser center wavelengths and wherein said second span of optical fiber is part of an optical fiber to be recognized.

4. The method as claimed in claim 1, wherein said backscattering pattern is previously obtained over the second span, wherein said first span of optical fiber is part of an optical fiber to be recognized and wherein said set of backscattering patterns is obtained for different values of OTDR laser center wavelengths.

5. The method as claimed in claim 1, wherein the step of comparing comprises: calculating a correlation coefficient of at least one of said backscattering patterns of said first span and said backscattering pattern of said second span and comparing the correlation coefficient to a threshold to determine if said second span is the same as said first span.

6. The method as claimed in claim 1, wherein the first and the second span of optical fiber each correspond to sub-portions of optical fiber links over which an OTDR trace was acquired.

7. The method as claimed in claim 1, wherein said backscattering patterns are acquired while the OTDR laser source is being polarization scrambled.

8. An OTDR system for comparing Optical Time-Domain Reflectometric (OTDR) signatures for optical fiber recognition, the OTDR system comprising:

an OTDR acquisition device connectable toward an end of the second optical fiber link for performing one or more OTDR acquisitions toward the second optical fiber link, wherein each OTDR acquisition is performed by propagating a test signal in the optical fiber link under test and detecting corresponding return light from the second optical fiber link so as to obtain an OTDR trace representing backscattered and reflected light as a function of distance in the optical fiber link; and a data storage storing a prerecorded set of backscattering patterns obtained over a first span of a first optical fiber link for different values of optical fiber temperatures or different values of OTDR laser center wavelengths, wherein each backscattering pattern corresponds to at least a portion of an OTDR trace acquired over the first span of first optical fiber link;

a processing unit comprising:

a signature recognition module comprising a comparison engine configured for comparing the backscattering pattern obtained over a second span of the second optical fiber link and corresponding to at least a portion of said OTDR trace, to the set of backscattering patterns of said first span to determine if the backscattering pattern of said second span matches one of the backscattering patterns of said set, wherein said second span is determined to be the same as said first span if a match is found.

9. The OTDR system as claimed in claim 8, wherein said set of backscattering patterns stored in said data storage is previously obtained over the first span for different values of optical fiber temperatures.

10. The OTDR system as claimed in claim 8, wherein said set of backscattering patterns stored in said data storage is previously obtained over the first span for different values of OTDR laser center wavelengths.

11. The OTDR system as claimed in claim 8, wherein said comparison engine is configured for calculating a correlation coefficient of at least one of said backscattering patterns of said first span and said backscattering pattern of said second span and comparing the correlation coefficient to a threshold to determine if said second span is the same as said first span.

12. The OTDR system as claimed in claim 8, wherein the first and the second span of optical fiber each correspond to sub-portions of optical fiber links over which an OTDR trace was acquired.

13. The OTDR system as claimed in claim 8, wherein said OTDR acquisition device comprises a polarization scrambler to scramble said test signal.

14. An OTDR system for comparing Optical Time-Domain Reflectometric (OTDR) signatures for optical fiber recognition, the OTDR system comprising:

a tunable OTDR acquisition device connectable toward an end of a first optical fiber link for performing one or more OTDR acquisitions toward the first optical fiber link, wherein each OTDR acquisition is performed by propagating a test signal in the optical fiber link under test and detecting corresponding return light from the first optical fiber link so as to obtain an OTDR trace representing backscattered and reflected light as a function of distance in the optical fiber link; and a data storage storing at least one pre-recorded backscattering pattern obtained over a second span of a second optical fiber link, wherein the backscattering pattern corresponds to at least a portion of an OTDR trace acquired over the second span of the second optical fiber link; and a processing unit configured for:

comparing backscattering pattern obtained over a first span of said first optical fiber link and corresponding to at least a portion of OTDR trace, to said pre-recorded backscattering pattern of said second span to determine if the backscattering pattern of said first span matches the backscattering patterns of said second span, wherein said second span is determined to be the same as said first span if a match is found; and if no match is found, tuning an OTDR laser source of said OTDR acquisition device to a different value of laser center wavelength to perform another OTDR acquisition and repeating the comparing step to find a match.

15. The OTDR system as claimed in claim 14, wherein said processing unit is further configured for calculating a correlation coefficient of at least one of said backscattering patterns of said first span and said backscattering pattern of said second span and comparing the correlation coefficient to a threshold to determine if said second span is the same as said first span.

16. The OTDR system as claimed in claim 14, wherein the first and the second span of optical fiber each correspond to sub-portions of optical fiber links over which an OTDR trace was acquired.

17. The OTDR system as claimed in claim 14, wherein said OTDR acquisition device comprises a polarization scrambler to scramble said test signal.

18. A non-transitory computer-readable storage medium comprising instructions that, when executed, cause a processor to perform the steps of:
receiving a set of backscattering patterns obtained over a first span of a first optical fiber link for different values of optical fiber temperatures or different values of OTDR laser center wavelengths, wherein each backscattering pattern corresponds to at least a portion of an OTDR trace acquired over the first span of first optical fiber link;
receiving a backscattering pattern obtained over a second span of a second optical fiber link and corresponding to at least a portion of an OTDR trace acquired over the second span of the second optical fiber link; and
comparing the backscattering pattern of said second span to the set of backscattering patterns of said first span to determine if the backscattering pattern of said second span matches one of the backscattering patterns of said set;
wherein said second span is determined to be the same as said first span if a match is found.

19. The non-transitory computer-readable storage medium as claimed in claim 18, wherein said set of backscattering patterns is previously obtained over the first span for different values of optical fiber temperatures and wherein said second span of optical fiber is part of an optical fiber to be recognized.

20. The non-transitory computer-readable storage medium as claimed in claim 18, wherein said set of backscattering patterns is previously obtained over the first span for different values of OTDR laser center wavelengths and wherein said second span of optical fiber is part of an optical fiber to be recognized.

21. The non-transitory computer-readable storage medium as claimed in claim 18, wherein said backscattering pattern is previously obtained over the second span, wherein said first span of optical fiber is part of an optical fiber to be recognized and wherein said set of backscattering patterns is obtained for different values of OTDR laser center wavelengths.

22. The non-transitory computer-readable storage medium as claimed in claim 18, wherein the step of comparing comprises: calculating a correlation coefficient of at least one of said backscattering patterns of said first span and said backscattering pattern of said second span and comparing the correlation coefficient to a threshold to determine if said second span is the same as said first span.

* * * * *